Patented Nov. 28, 1933

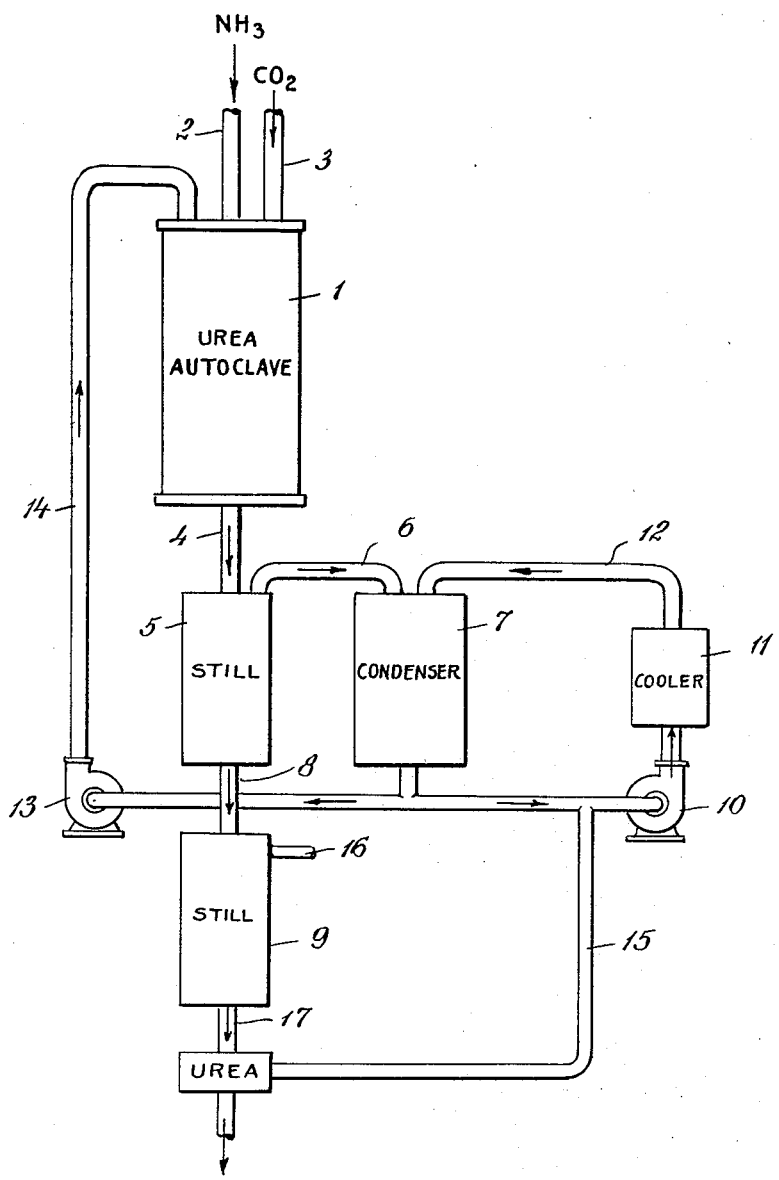

1,937,116

UNITED STATES PATENT OFFICE 1,937,116

UREA MANUFACTURE

Harry C. Hetherington, Wilmington, Del., assignor, by mesne assignments, to E. I. du Pont de Nemours & Company, Wilmington, Del., a corporation of Delaware Application January 2, 1931. Serial No. 506,105

7 Claims. (Cl. 260—125)

It is known that when ammonia and carbon dioxide or their compounds with or without water are heated together in a closed system, urea is formed. The conversion to urea is only partial, however, equilibrium being established, for example, when about 40% of the theoretical conversion at 150° C. has been attained. Higher conversions are obtained when ammonia in excess of the stoichiometric proportions is used, but in no case is the theoretical conversion attained. The disposition of the unconverted ammonia therefore has an important bearing on the cost of the urea synthesis and conversion.

Suggestions have been made for the utilization of the unconverted ammonia in processes for the manufacture of products other than urea. For such purposes the equilibrium melt containing urea, water, and unconverted ammonia and carbon dioxide may be used directly or may be distilled to expel the ammonia and carbon dioxide as gases. This gas mixture is suitable for use in processes such as the manufacture of ammonium sulphate from gypsum, in which latter case the carbon dioxide, as well as the ammonia, is useful. On the other hand, ammonium salts may be made directly by combination with the desired acid and expulsion of the carbon dioxide.

However, combination of the urea synthesis with another process places an undesirable limitation on the process when the demand for the by-product determines the quantity of urea which may be economically produced. Many previous efforts have, therefore, been made to develop a self-contained urea process in which the unconverted gases might be recovered and returned to the urea synthesis.

U. S. Patent 1,429,483, for example, proposes that the unconverted ammonia and carbon dioxide obtained by distilling the equilibrium melt, be returned to the synthesis unit by recompression of the mixture the latter being maintained in a heated condition to prevent clogging of conduits and compressor by solid ammonium carbamate, which would otherwise be deposited. The power requirement for this recompression is high, and serious mechanical difficulties are encountered due to the extremely corrosive nature of a moist mixture of ammonia and carbon dioxide when hot.

U. S. Patent 1,453,069 describes a method of handling the recovered gases to avoid the costly recompression. Briefly, the method involves the absorption of the gases in water and the conveyance of the resulting solution to a "boiler" from which the gases are expelled to the urea autoclave by means of heat. This method requires an uneconomical expenditure of heat in dissociating and expelling the gases from the "boiler".

U. S. Patent 1,730,208 describes a method in which the unconverted ammonia and carbon dioxide are separated from each other following their distillation from the urea equilibrium melt. The gases may then be separately compressed to liquefaction and returned by pumps to the synthesis unit. While this method avoids many of the technical difficulties of other methods, the separation of the two gases is a relatively costly operation.

In German Patent 350,051 distillation temperatures of 160–200° C. are used and the condenser is maintained as low as 120° C. My experience has shown that operation by this procedure would necessarily involve considerable decomposition of urea as well as clogging of the condenser with solid ammonium carbamate, the melting point of which is 150° C.

Now it is well known that when the pressure over an equilibrium urea synthesis melt is reduced while the temperature is maintained, urea is decomposed, the rate of decomposition increasing with increasing temperature. The retarding effect of ammonia on this decomposition is also well known. The rate of decomposition of urea at temperatures above 150° C. is comparatively rapid, however, even in the presence of excess ammonia. Consequently the distillation of the urea carbamate melt must be effected rapidly and from this it follows that the temperature differential between still and condenser should be as high as practicable.

It is evident that the distillation of urea melts, as heretofore practiced is attended with the greatest difficulties since the lower practicable temperature limit of the condenser, if formation of solids is to be avoided, is fixed by the melting point of carbamate.

It is the object of the present invention to provide a method of operation by which urea synthesis melts may be distilled with little or no decomposition of urea, and the distillate, consisting essentially of the unconverted carbamate, recovered in liquid form capable of being returned by pumps to the synthesis apparatus for further conversion.

Other objects and advantages of the invention will be apparent from the following specification in which the preferred embodiments are described and from the accompanying drawing in which—

The figure is a diagrammatic representation of an arrangement of apparatus and flow of materials for one method of practicing the invention.

In accordance with the present invention the unconverted ammonia and carbon dioxide are separated from the urea of the synthesis melt by distillation at below 150° C. and the hot distillate is condensed by contact with a relatively cooler body of liquid containing little or no water. The ammonia and carbon dioxide liquefy in this condensing medium in the form of ammonium carbamate. A portion of the resulting liquid is submitted to heat and pressure for production of further urea and another portion is cooled and circulated to pass as before into contact with succeeding portions of the hot distillate. A substantially constant body of circulating condensing medium can readily be maintained by withdrawing portions thereof corresponding to the amount of ammonium carbamate recovered by the distillation.

The maintaining of the circulating condensing medium in a liquid state is made possible by including therewith a substance which will dissolve ammonium carbamate or lower the melting point thereof below the temperature at which the condensing takes place. Various materials may be used for this purpose, but I have found it particularly advantageous to employ urea since, being of necessity present in the reaction system in any event, it is readily available in any desired quantity and its use for the purpose presents no separation problem. I have found, moreover, that the presence of free ammonia in the condensing medium is also advantageous, particularly when urea is included therein, since in the presence of ammonia a liquid condition can be maintained at a lower temperature than would otherwise be possible. When employing urea, then, I prefer to operate the urea synthesis with such an excess of ammonia that the vapors evolved on distillation of the melt contain an excess of ammonia over that required for the formation of ammonium carbamate and the presence of this excess in the gases will, on contact thereof with the condensing medium, produce the above noted effect.

Other substances than urea may be used for the purpose of maintaining the condensing medium in a liquid state, although with less convenience than urea for the reasons set forth above. Any material selected should be considered from the standpoint of its effect on the urea synthesis and the relative ease of recovery from the ultimate products of the synthesis. Ammonium formate or formamide may be mentioned as substances that can be used. Water, on the other hand, although effective in lowering the melting point of ammonium carbamate, is undesirable in any very substantial quantity because of its bad effect upon the efficiency of the urea synthesis. Therefore, although small amounts of water may be present in the condensing medium, large quantities thereof should be avoided and in any event water alone should not be relied upon as the sole liquefying agent for the ammonium carbamate.

The amounts of urea, urea and ammonia, etc. used will depend upon the respective temperatures at which the still and condenser are to be operated; the higher the condenser temperature the lower will be the requirement of liquefying agent. On the other hand, it has been pointed out that advantages are to be gained by resort to relatively low distillation temperatures. It is evident, therefore, that the optimum temperatures and quantities of liquefying agent will depend largely upon the particular advantages it is desired to strengthen.

The variation in quantity of urea and ammonia required, for example, is illustrated by the following solubility values. At 15–20° C. a solution of 46 parts of urea in 33 parts of ammonia will dissolve 21 parts of carbamate; at 35–40° C. 35 parts of ammonia and 35 parts of urea dissolve 30 parts of carbamate; at 75–80° C. 33 parts of ammonia and 17 parts of urea dissolve 50 parts of carbamate.

The actual condensation of the ammonia and carbon dioxide evolved on distillation of the urea melt may be effected in various ways. For example, the hot distillate may be conducted directly into a body of the liquid condensing medium or the latter may be allowed to flow down a tower or column up which the hot distillate is caused to pass.

The invention is applicable to both the batch and continuous type of operation of the urea synthesis. In the batch method the distillation may, if desired, be effected in the reaction vessel. In the continuous method it will obviously be preferable to withdraw the synthesis melt continuously to a separate still in which the desired separation is effected.

From a consideration of the foregoing, the advantages to be gained from the application of the invention to the commercial synthesis of urea will readily be apparent to those skilled in the art. The assurance of fluidity of condensate and the advoidance thereby of clogging of the condensing apparatus, pipes, pumps, etc., are evidently of major importance. These make possible the attainment of an adequate pressure drop between still and condenser without resort to objectionably high distillation temperatures. The lower distillation temperatures, in turn, materially reduce the rate of corrosion of the apparatus which is a serious problem in the practical synthesis of urea.

While the manner of application of the invention may be varied widely, particularly as regards specific operating conditions as well as apparatus and materials employed, the following will indicate one method of practicing the invention.

*Example 1.*—Referring to the accompanying drawing, a high pressure autoclave (1), in which is effected the actual reaction of ammonia and $CO_2$, delivered by conduits (2) and (3), respectively, is connected by (4) to a still (5). A vapor discharge (6) leads from this still to condenser (7) and a liquid outlet leads to still (9). The pump (10), cooler (11), and conduit (12) serve to circulate the liquid cooling medium through the condenser. A portion of the liquid discharged from the condenser can be returned to the autoclave (1) by pump (13) and pipe (14).

In operating the process the urea synthesis melt containing urea, water, and unconverted ammonium carbamate, which may be at a temperature of 150° C. or more and a pressure of, say, 100 atmospheres, is conveyed from the autoclave (1) by way of (4) to the still (5) maintained at about 130° C., but at a relatively lower pressure by reason of its connection to the cooler condenser (7). A hot distillate evolved from the still (5) is conducted by (6) to the condenser (7) in which it is caused to contact intimately with the liquid condensing medium, which is supplied to the condenser by the pipe (12). The temperature of the condenser is maintained at about 20°. The condensing liquid introduced through (12) has a composition corresponding to about 33 parts ammonia, 46 parts urea, and carbamate not in excess of 21 parts. The desired concentration of ammonia is maintained by suitably adjusting the portions of the ammonia and CO₂ introduced into the autoclave (1) by conduits (2) and (3), respectively. The desired content of urea in the condensing medium is controlled by suitable additions of urea in the form of a highly concentrated solution or melt through the conduit (15). The liquid withdrawn from the condenser consisting of the material introduced by way of (12), as well as the ammonia and carbon dioxide which have condensed in the form of ammonium carbamate, is partly withdrawn by way of the pump (13) and the conduit (14) to be returned to the autoclave (1) for further synthesis. The balance of the liquid is recirculated through the pump (10), cooler (11), and pipe (12) to be utilized in condensing further portions of the hot distillate delivered from the still (5).

The still (5), which operates against back pressure from the condenser (7), delivers through (8) a liquor consisting for the most part of urea but not completely stripped of its volatile constituents, principally water. The residual amounts of these are removed and recovered by a final distillation at about atmospheric pressure in the still (9). The volatile products of this distillation are removed by way of (16) and the molten urea, delivered through (17), is worked up in the usual way.

It is to be understood that the present invention is applicable to the synthesis of urea from ammonia and carbon dioxide, either as such or as compounds thereof, for example carbamate or carbonates, and, therefore, in the following claims, where reference is made to the synthesis of urea by heating ammonia and carbon dioxide, it is intended to include not only these materials per se but also the equivalent compounds thereof.

Various changes may be made in the method described without departing from the invention or sacrificing any of the advantages thereof.

I claim:

1. In the process for the synthesis of urea by heating ammonia and carbon dioxide at a temperature of at least 150° C. and a pressure of at least 100 atmospheres, the improvement which consists in separating the unconverted ammonium carbamate from the synthesis melt by distillation, condensing the distillate by contact thereof with a relatively cooler body of liquid ammonium carbamate, subjecting a part of the resultant liquid to the urea synthesis reaction and cooling and returning another part of said liquid to contact with succeeding portions of said distillate.

2. In the process for the synthesis of urea by heating ammonia and carbon dioxide at a temperature of at least 150° C. and a pressure of at least 100 atmospheres, the improvement which consists in separating the unconverted ammonium carbamate from the synthesis melt by distillation and condensing the hot distillate by cooling the same in the presence of substantial amounts of urea.

3. In the process for the synthesis of urea by heating ammonia and carbon dioxide at a temperature of at least 150° C. and a pressure of at least 100 atmospheres, the improvement which consists in separating the unconverted ammonium carbamate from the synthesis melt by distillation and condensing the hot distillate by cooling the same in the presence of substantial amounts of urea and free ammonia.

4. In the process for the synthesis of urea by heating ammonia and carbon dioxide at a temperature of at least 150° C. and a pressure of at least 100 atmospheres, the improvement which consists in subjecting the synthesis melt to distillation at a pressure below 100 atmospheres and a temperature of at least 20° lower than that of the synthesis, cooling and thereby condensing the hot distillate, and utilizing a portion of the urea recovered from the distillation residue to maintain the distillation condensate in a liquid state.

5. In the process for the synthesis of urea by heating ammonia and carbon dioxide at a temperature of at least 150° C. and a pressure of at least 100 atmospheres, the improvement which consists in subjecting the synthesis melt to distillation at a pressure below 100 atmospheres and a temperature of at least 20° lower than that of the synthesis, cooling and thereby condensing the hot distillate, utilizing a portion of the urea recovered from the distillation residue to maintain the distillation condensate in a liquid state, and utilizing at least a part of said condensate in the further synthesis of urea.

6. In a process as set forth in claim 2, the step of recovering urea from the distillation residue, and condensing the hot distillate by cooling the same in the presence of a portion of said urea.

7. In a process as set forth in claim 2, the step of utilizing at least a part of the condensate in the further synthesis of urea.

HARRY C. HETHERINGTON.